Figure 1:
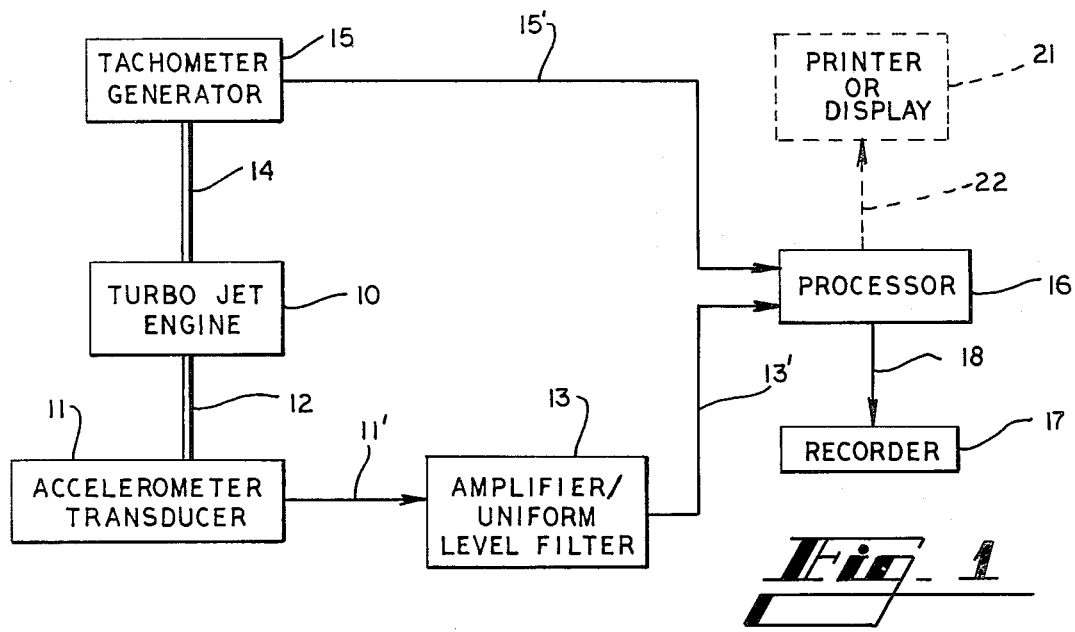

United States Patent [19]

Curtis et al.

[11] 4,238,960
[45] Dec. 16, 1980

[54] MEANS FOR BALANCING ROTORS OF A MACHINE

[75] Inventors: George C. Curtis; Joe A. McInturff, both of Marietta; Herbert J. Rubel, Atlanta; William F. Wall, Marietta, all of Ga.

[73] Assignee: Lockheed Corporation, Burbank, Calif.

[21] Appl. No.: 964,258

[22] Filed: Nov. 27, 1978

[51] Int. Cl.³ .............................................. G01M 1/16
[52] U.S. Cl. ....................................................... 73/462
[58] Field of Search ................... 73/462, 465, 463, 660

[56] References Cited

U.S. PATENT DOCUMENTS

| 3,048,041 | 8/1962 | Trimble | 73/462 |
|---|---|---|---|
| 3,939,715 | 2/1976 | Davis | 73/462 |
| 4,010,637 | 3/1977 | Harwell et al. | 73/658 |
| 4,063,461 | 12/1977 | Buzzi | 73/462 |

*Primary Examiner*—Jerry W. Myracle
*Attorney, Agent, or Firm*—John J. Sullivan

[57] ABSTRACT

An accelerometer mechanically attached to a machine senses the machine rotor's unbalance and outputs an electrical signal which is indicative of the magnitude and position of the rotor unbalance. A tachometer generator's rotor is mechanically coupled to the machine rotor and outputs an electrical signal delineating the speed and rotational position (with respect to time) of the rotor. By physically indexing one of the tachometer generator rotor poles (north or south) to an index/mark on the engine rotor, the position of the mark at any instant in time is determined. The physical location of the unbalance is obtained by determining the phase relationship of the unbalance signal to that of the tachometer generator signal. This is accomplished by obtaining simultaneous "snapshots" of the two signals employing multiplexing techniques to alternately sample each signal. The signal is then recorded and later reduced by ground equipment. Phasing of the two signals can be visually determined either from the reduced signal or an electronic processor may be utilized to provide a real time measurement of the phasing. The angle between the rotor unbalance and the index/mark is the same as the phasing angle after correcting for any phase shifting due to electronics and rotor resonance.

4 Claims, 2 Drawing Figures

Δ=75° ROTOR UNBALANCE LAGS TACHOMETER

MEANS FOR BALANCING ROTORS OF A MACHINE

This invention relates broadly to balancing techniques for rotating bodies or spools and more particularly to a method of and means for balancing the rotors of a machine, notably the internal rotors of a jet engine of the type employed on aircraft to prevent undue wear and premature break-down and failure.

In an earlier invention of Malcolm J. Harwell, Joe A. McInturff and Herbert J. Rubel, U.S. Pat. No. 4,010,637 issued Mar. 8, 1977 and assigned to Lockheed Corporation, assignee of the present invention, a Machine Vibration Monitor and Method is described. This patent in essence discloses a technique for detecting the imbalance in an engine's rotors by measuring the magnitude of vibration in the rotors and comparing it against a known allowable limit. Upon excedence of this limit the particular rotor causing the excessive vibration is determined by analyzing the individual components. Separate operations are required to correct the defective rotor, presumably by repair or replacement.

The present invention envisions improvements to the above patented techniques by the incorporation of means in the system to determine the degree of imbalance of the defective rotor and the specific location of a weight to be added to that rotor to compensate for such imbalance. By so doing vibration is reduced or eliminated and a complete overhaul and replacement of the rotor is avoided at least for the time being.

The means provided by the present invention for determining the amount and location of rotor unbalance is operable during normal machine operation. This is significant in the case of an aircraft engine. Rotor unbalance levels of jet engines detected in flight may be drastically different from that measured on the ground. As an example consider engines having rotor resonance in the operating range such as those on the wide bodied aircraft. In many instances an inflight power adjustment may be set where the engine is operating near peak resonance. Since the engine speed is very stable at altitude the engine will dwell on the peak resonant point resulting in higher vibration levels. Many hours, fuel and aircraft downtime are usually wasted in engine ground runs attempting to verify the inflight vibration indications but the ground environment is not conducive to a stable engine operation. Consequently the peak resonant vibration is never obtained. Present procedures normally require engine removal from aircraft and multiple runs in a test cell to grossly balance an aircraft fan rotor. Determining, inflight, the amount and location of rotor unbalance is very desirable since it will result in a more accurate and reliable means for balancing rotors, and eliminates the expense of multiple engine runs on the ground.

Moreover, with the techniques herein proposed, relatively small unbalances in the engine rotors can be corrected as they develop resulting in a better performing and more reliable engine. Also, consequential damage or wear to other parts of the engine and its accessories is avoided or at least minimized.

As in the patented system referred to above this invention also employs the uniform level concept which is based on a filter design that conditions the vibration signal which is received from an accelerometer transducer. This transducer is coupled mechanically to the engine in such a manner so as to produce a composite uniform level signal regardless of the engine's operating speed. The signal is also conditioned so as to give cognizance to the slower speed rotors' vibration signal thereby resulting in an output signal where each of the fundamental rotor vibration components can be absolutely recognized and its magnitude determined.

Unlike the patented system the present invention utilizes a generator mechanically coupled to each engine rotor which outputs an electrical waveform proportional to the position and speed of the rotor. A processor is employed to convert the fundamental vibration signal into its separate fundamental frequencies utilizing well known fast fourier transform techniques and then determining the phase relationship of the vibration frequency component of interest to that of the generator signal and where an imbalance condition exists to determine the corrective weight and location thereof on the rotor. Well-known programming techniques are utilized to set the processor to perform this function.

Figure 2:
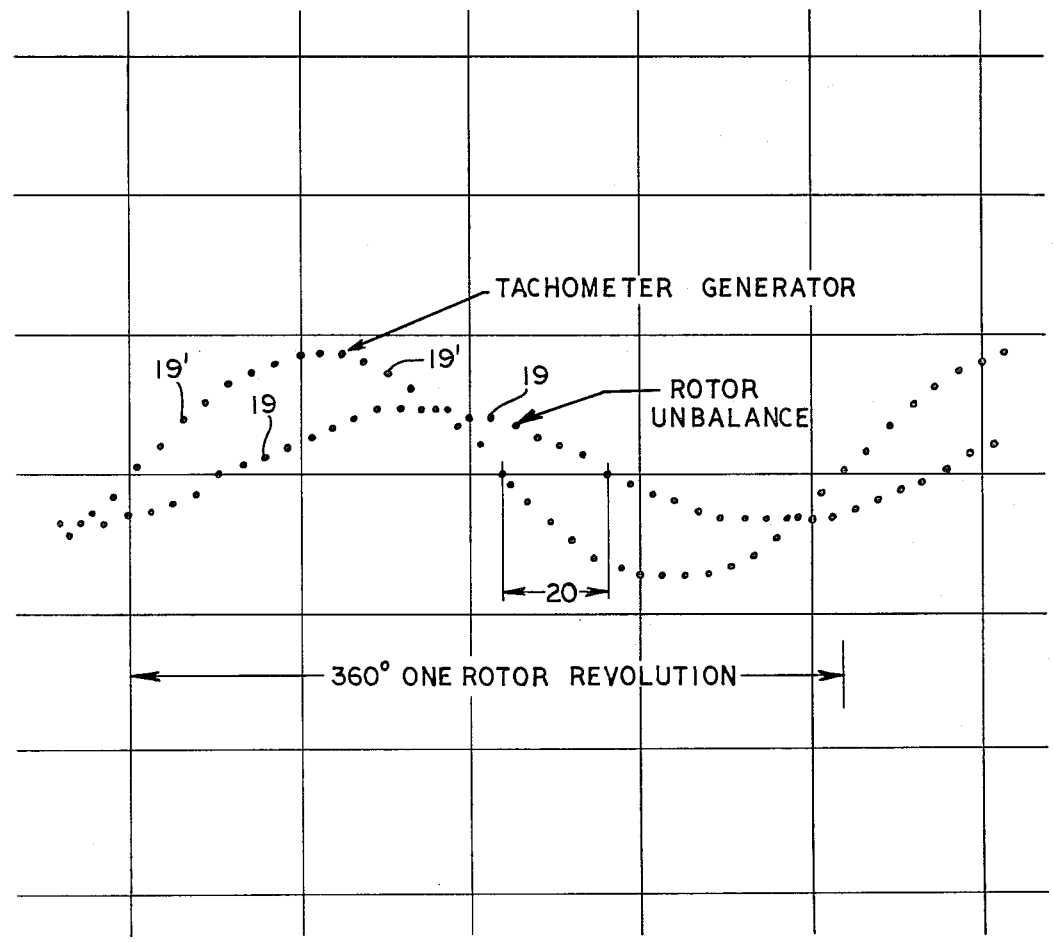

With the above and other objects in view as will be more apparent this invention consists in the construction, combination and arrangement of parts all as hereinafter more fully described, claimed and illustrated in the accompanying drawings, wherein:

FIG. 1 is a block diagram of a rotor balancing mechanism in accordance with the teachings hereof to show generally the essential elements of the mechanism and the interconnection thereof; and FIG. 2 is an example of an output product of the mechanism of FIG. 1 to illustrate the vibration signal and the generator signal and the phase differences therebetween indicative of a rotor unbalance in magnitude and position.

Referring more particularly to the drawings and specifically FIG. 1, 10 designates a rotor and housing, for example of a turbo jet engine on an aircraft which is under observation. An accelerometer transducer 11 is mechanically connected to the rotor housing 10 as indicated at 12. The transducer 11 is sensitive to the vibration components of the rotor 10 and outputs a composite, electrical signal which is proportional to the second derivative of the displacement of these components. An amplifier and uniform level filter 13 is operatively connected as indicated at 11' to the transducer 11 and serves to receive the signal from the transducer 11 and raise it to a more usable level. The uniform level filter as taught by the aforementioned patent conditions the vibration signal whereby a single exceedance limit can be established. In brief, this is accomplished via a hardware filter whose characteristics are such that the vibration signal is conditioned to remove the frequency affect (frequency squared for acceleration) and attenuate or amplify the signal at a rate inversely proportional to a non-linear limits curve. For example, a filter having a slope of 12 db per octave will remove the frequency component. Additional attenuation, less attenuation or even amplification is employed to compensate for non-linear limits such as for example an aircraft engine having limits of 5 mils at 60% speed, 4 mils at 80% speed, and 3 mils at 100% speed. The signal that is output from the amplifier/filter 13 is indicative of the imbalance condition of the rotor 10, i.e., both the magnitude and angular position of that unbalance.

As in the Lockheed patent identified above, the signal amplitude is related to that of the rotor unbalance magnitude which in turn is related to the corrective weight. In order to determine the position at which the unbalance occurs a direct connection 14 is provided between the rotor 10 and a generator, such as for example the existing tachometer generator 15 customarily employed in aircraft. In the event there were no existing tachometer generator 15, a generator of conventional design would be used for the purpose.

The tachometer generator 15 is oriented or indexed to the rotor 14 and outputs an electrical waveform proportional to the position and speed of the rotor 10. Thus, as the rotor turns through one revolution, the tachometer generator 15 will output a voltage sinewave of one cycle. Also by physically indexing the tachometer generator 15 to an index/mark on the rotor 10 the position of the rotor 10 is described by the voltage of the tachometer generator 15.

As stated earlier, the waveform output from the amplifier/filter 13 is a function of the position of rotor unbalance; and is directly relatable to the index/mark of the rotor 10 via the signal of the tachometer generator 15. The phase relationship between the tachometer generator signal and the rotor vibration signal is utilized to determine the location of the rotor unbalance.

In order to determine the phase relationship of the rotor 10 unbalance to the tachometer generator 15, digital processing techniques are employed. To this end the rotor vibration signal output from the amplifier/filter 13 and the tachometer signal from the rotor tachometer generator 15 are input to a digital processor 16 through appropriate links 13' and 15' respectively. The processor 16 contains analog to digital conversion circuitry and when required contains signal conditioning as is customary in similar processing systems. The processor 16 alternately samples or accesses the tachometer signal and the vibration signal, resulting in a vibration/tachometer interleaved signal. This processor 16 may be a general purpose processor, such as a TI980 manufactured and sold by Texas Instrument, Inc., Dallas, Texas which when using the instructions included with it by the manufacturer permits it to be used to alternately sample or access the tachometer signal and the vibration signal and separate/filter the frequency component of interest. The number of accesses and the rate of access is determined by the speed range of the rotor 10 in order to provide adequate signal definition. The signal is then recorded for subsequent processing.

More particularly, the interleaved signal from the processor is then fed into a recorder 17 operatively connected as indicated at 18 to the output side of the processor 16. The recorded data is thereafter available for processing by standard ground reduction equipment.

FIG. 2 is an example of the output product of the recorder 17, i.e., the recorded data as received from the processor 16. The several points 19 and 19' represent each data sample by the processor 16 and, when plotted by ground equipment, results in a time-shared plot of the tachometer generator signal 19' and the rotor vibration signal 19. The phase difference 20 in the two signals is indicative of the position of the rotor unbalance with respect to rotor index.

The actual angle of the unbalance with respect to the rotor index/mark is the phase shift 20 plus system corrections. The system corrections include phase shifts due to electronics and rotor resonance. The rotor unbalance signal must be corrected for the electronic phase shift caused by the accelerometer transducer 11, the amplifier/filter 13 and the processor 16. The phase shift is obtained from manufacturers data or can be determined using common techniques such as applying excitation to the accelerometer/transducer 11 via a vibration table, then measuring/determining the phase shift of the accelerometer/transducer 11, amplifier/filter 13 and processor 16 with respect to the vibration table excitation.

The rotor unbalance signal must also be corrected for the phase shift resulting from the operation of the rotor at its natural frequency which is known from general textbooks and the rotor manufacturer's data. The tachometer generator signal phasing must also be corrected for any phase shift caused by the processor 16. The application of these corrections to the phase angle 20 results in the angle between rotor unbalance and the tachometer generator rotor and more specifically to a known physical point/index mark on the rotor.

Corrective balance is effected by installing weights on the rotor 10 at an angle equal to the corrected phase difference 20 plus 180° or alternatively mass is removed from the rotor at the point thereon of the corrected phase difference 20. The size of the weight/mass is proportional to the magnitude of the rotor unbalance and more specifically can be obtained from data furnished by the rotor manufacturer relating rotor unbalance to correction weights.

As an alternate of the above the processor 16 may be programmed, utilizing common program techniques as given in the processor manufacturer's manual which accompanies the processor, to measure the magnitude of the rotor unbalance and the phase relationship of the vibration signal to that of the tachometer signal. The position and the amount of corrective weight to be added is then announced on a printer or display 21 operatively connected as at 22 to the output side of the processor 16.

What is claimed is:

1. Means for balancing multiple rotors of a machine comprising:
    an accelerometer transducer connected to said machine to receive the total vibration of all said rotors at all operating speeds and produce a single output signal;
    an amplifier and uniform level filter connected to said transducer to receive said single output signal and raise it to a predetermined substantially constant level signal over the entire speed range of said machine, said filter having components selected to simultaneously compensate for both the frequency dependence of said single output signal and the variable displacement allowables of said rotors;
    a generator connected to each machine rotor to produce a continuous sinusoidal output signal proportional to the position and speed of its associated rotor, each said generator being indexed to its said rotor;
    a processor connected to said filter and to each said generator to alternately receive the respective constant level signal and the continuous, proportional output signals aforesaid and produce a corresponding output signal for each rotor to be balanced; and
    recording means connected to said processor to receive and retain each said corresponding output signal.

2. The invention of claim 1 wherein said processor is programmed to produce an output product on which each said corresponding output signal is plotted.

3. The method of balancing multiple rotors of a machine consisting essentially of:

generating a first electrical output signal which is directly proportional to the vibration acceleration developed by all of the rotors in the machine when operating;

conditioning said first electrical output signal to cause the frequency of each individual rotor to have approximately the same magnitude whereby the frequencies of all of the rotors remain substantially constant over the speed range of the machine;

converting said first electrical output signal so conditioned into separate individual electrical signals each of whose fundamental frequency is proportional to the vibration acceleration of each individual machine rotor;

generating a second electrical output signal which is directly proportional to the position and speed of each rotor to be balanced as indicated by the magnitude of the signal;

comparing the phase angles of said first and each said second electrical output signals; and compensating for a difference in each said phase angle by modifying the mass of each said rotor at a location thereon diametrically opposed to said phase angle difference.

4. The method of claim 3 wherein said phase angles comparing step includes sampling said first and said second electrical output signals alternately and recording them.

* * * * *